United States Patent [19]

Adams

[11] E Patent Number: Re. 32,221

[45] Reissued Date of Patent: Aug. 12, 1986

[54] VARIABLE DILUTION FILTER

[76] Inventor: John M. Adams, 2512 Cedar La., Mechanicsville, Va. 23111

[21] Appl. No.: 656,993

[22] Filed: Oct. 2, 1984

Related U.S. Patent Documents

Reissue of:

[64] Patent No.: 4,433,696
Issued: Feb. 28, 1984
Appl. No.: 307,973
Filed: Oct. 2, 1981

[51] Int. Cl.[4] ..... A24D 1/04; A24D 3/00

[52] U.S. Cl. ..... 131/336; 131/198.1

[58] Field of Search ..... 131/198 R, 336, 198 A, 131/344, 339, 198.1, 198.2

[56] References Cited

U.S. PATENT DOCUMENTS

| | | | |
|---|---|---|---|
| 2,819,720 | 1/1958 | Burbig | 131/344 |
| 2,994,251 | 8/1961 | Pollmann | 131/344 |
| 3,359,988 | 4/1965 | Thomson | 131/336 |
| 3.402,724 | 10/1965 | Blount et al. | 131/336 |
| 3.410,274 | 2/1965 | Davis | 131/336 |
| 3,441,028 | 3/1967 | Wall | 131/336 |
| 3,441,029 | 6/1966 | Wall | 131/336 |
| 3,482,579 | 2/1965 | Davis | 131/336 |
| 3,486,508 | 2/1967 | Sipos | 131/336 |
| 3,503,406 | 10/1968 | Riegel et al. | 131/331 |
| 3,590,825 | 11/1967 | Davis | 131/336 |
| 3,605,756 | 10/1967 | Stewart | 131/336 |
| 3,695,274 | 11/1970 | Summers | 131/336 |
| 3,707,975 | 3/1971 | Davis | 131/336 |
| 3,759,268 | 8/1970 | Plourde | 131/331 |
| 3,789,855 | 6/1971 | Norman | 131/336 |
| 3,800,805 | 10/1972 | Horsewell et al. | 131/336 |
| 3,847,161 | 11/1974 | Morgenstern . | |
| 3,858,587 | 2/1974 | Cavelli et al. | 131/351 |
| 4,273,141 | 6/1981 | Van Tilburg . | |

FOREIGN PATENT DOCUMENTS

| | | | |
|---|---|---|---|
| 891728 | 7/1982 | Belgium . | |
| 0101173A1 | 2/1984 | European Pat. Off. . | |
| 2130862 | 12/1972 | Fed. Rep. of Germany . | |
| 2273443 | 12/1975 | France | 131/339 |
| 1214319 | 12/1970 | United Kingdom | 131/349 |
| 1330936 | 9/1971 | United Kingdom . | |
| 1400278 | 6/1972 | United Kingdom . | |

*Primary Examiner*—V. Millin
*Attorney, Agent, or Firm*—Robbins & Laramie

[57] ABSTRACT

Smoking article (10) has a filter mouthpiece (14) with a first stage filter element (18) and second stage filter element (19). First stage filter element (18) is rigidly attached to tipping paper (22). Second stage filter element (19) is free to move longitudinally in mouthpiece (14) and may be made to move axially by tapping the cigarette, thus, covering some of the ventilation holes (16) and changing the smoke to air ratio and the flavor.

19 Claims, 5 Drawing Figures

VARIABLE DILUTION FILTER

Matter enclosed in heavy brackets [ ] appears in the original patent but forms no part of this reissue specification; matter printed in italics indicates the additions made by reissue.

BACKGROUND OF THE INVENTION

This invention relates to smoking articles in general and more particularly to a ventilated cigarette with means to adjust the smoke to ventilation air ratio.

DESCRIPTION OF THE PRIOR ART

The current trend in cigarette manufacturing has been to reduce the concentration of certain components of smoke. For example, filters made of fibrous materials such as cellulose acetate are used to lower the concentration of particulate matter in the smoke generated in smoking. Ventilation into the filter has been used to further reduce the concentration of particulate matter and also to lower the concentration of gas phase components.

Filtration of the smoke and ventilation into the cigarette filter both affect the flavor of the cigarette. In particular, as ventilation is increased and smoke to ventilation air ratio is reduced, the flavor of the cigarette is reduced. Since the ventilation ratio on most cigarettes is fixed at the factory, a smoker not satisfied with the flavor of a particular cigarette would have no choice but to change brands, when all he was dissatisfied with was the highly diluted flavor of smoke he was receiving.

Prior art methods of componsating for this problem have met with varying degrees of success. Regal et al, U.S. Pat. No. 3,503,406 and Thompson, U.S. Pat. No. 3,359,988 use sliding external mechanical sleeves which must be positioned so that openings in the slidable sleeve are aligned with openings in the filter mouthpiece. These methods add to the manufacturing cost in that an additional piece must be added to each cigarette filter.

Other devices such as those disclosed by Cavelli, U.S. Pat. No. 3,858,587 and Sipos, U.S. Pat. No. 3,486,508 employ devices that must be operated with the smokers teeth as in Cavelli or with the smokers tongue as in Sipos. These methods are not aesthetically pleasing and suffer from a lack of uniformity when mass produced at the rate modern cigarettes are manufactured.

It is, therefore, an object of the present invention to provide a cigarette wherein the smoke to ventilation air ratio may be changed to suit the preference of the smoker.

It is also an object of the present invention to provide a cigarette with variable smoke to ventilation air ratio which is compatible with current high speed cigarette manufacturing equipment.

Yet another object of the present invention is to produce a cigarette with a variable smoke to ventilation air ratio that is aesthetically pleasing to the smoker.

SUMMARY OF THE INVENTION

According to the present invention, the foregoing and other objects are attained by providing a smoking articles with a first stage filter which is rigidly attached to the tipping paper at the mouth end of the mouthpiece. A second stage filter element located forward of the first stage element is free to slide axially and may be made to move rearward by tapping the mouthpiece end of the smoking article on a hard surface. Rearward movement of the second stage filter element covers some of the ventilation holes located in the tipping paper between the first stage and second stage filter element which increases the smoke to ventilation ratio thus increasing the flavor of the cigarette.

BRIEF DESCRIPTION OF THE DRAWINGS

A more complete appreciation of the invention and many of the attendent advantages thereof will be readily apparent by reference to the follow detailed description when considered in connection with the accompanying drawings wherein.

DESCRIPTION OF THE PREFERRED EMBODIMENT

Figure 1:
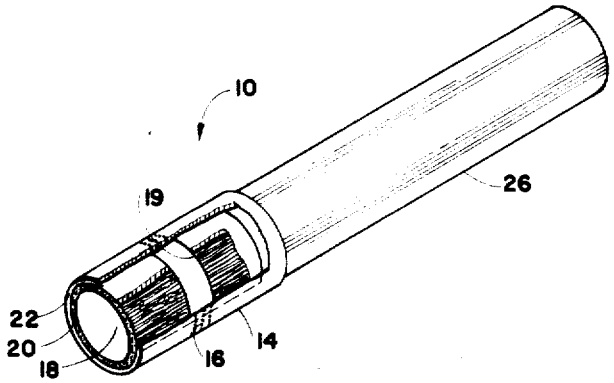
FIG. 1 is a perspective view, partially broken away, of a smoking article according to the present invention.
Figure 2:
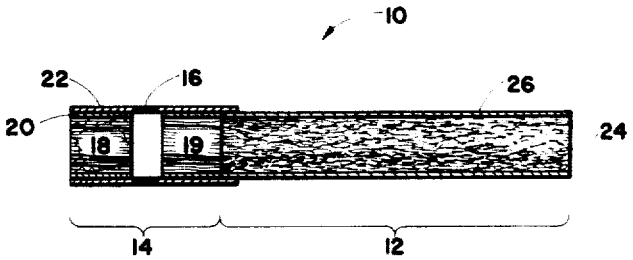
FIG. 2 is a longitudinal cross-section of the invention shown in FIG. 1.

Referring now more particularly to the drawings and specifically to FIG. 1 there is illustrated a preferred embodiment of the invention as it would be used in a smoking article, in this case a cigarette designated generally by the numeral 10. Cigarette 10 has two major parts, smoking cylinder 12 and filter mouthpiece 14.

Filter mouthpiece 14, which is approximately cylindrical in shape, substantially conforms to the cross-sectional size and shape of smoking cylinder 12. Filter mouthpiece 14 consists of a first stage filter element 18 and a second stage filter element 19 enclosed by tipping paper 22. First stage filter element 18 may be of any filtering material, but in the preferred embodiment is cellulose acetate. Plug wrap 20 encloses first stage filter element 18 and is rigidly attached to tipping paper 22. Second stage filter element 19 is similar in construction to the first stage filter element 18, but is not attached to tipping paper 22 and is thus free to move in an axial direction. Filter elements 18 and 19 may be used without plug wrap 20. For example, a nonwrapped acetate filter element, in which the outer surface has been bonded together with heat may be used.

Tipping paper 22 is air impervious and attaches filter mouthpiece 14 to smoking cylinder 12. Ventilation holes 16 in air impervious tipping paper 22 admit outside air to filter mouthpiece 14 in the space between first stage filter element 18 and second stage filter element 19.

Figure 3:
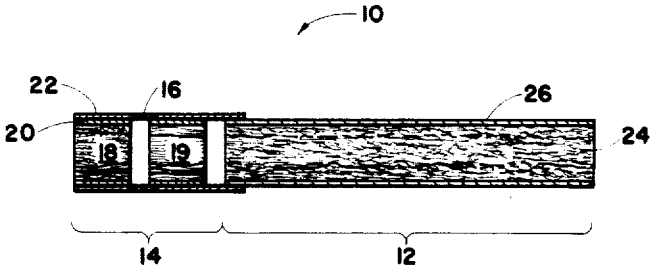
FIG. 3 is a longitudinal cross-section of the invention shown in FIG. 1 wherein the second stage element has moved partially to the rear.

As smoking article 10 is consumed, smoke from the burning coal of the cigarette travels through smoking cylinder 12. Air also enters smoking article 10 through ventilation holes 16 and mixes with the smoke in filter mouthpiece 14. In modern, highly diluted, highly filtered cigarettes the flavor of the resulting smoking article may be such that some smokers are not satisfied. In this event, the mouthpiece 14 of smoking article 10 may be tapped on a hard surface. This causes second stage filter element 19 to slide toward first stage filter element 18, as shown in FIG. 3, occluding some of ventilation holes 16. Since ventilation air must now be drawn through ventilation holes 16, porous plug wrap 20, and second stage filter element 19, less ventilation air enters filter mouthpiece 14. Thus, the resulting smoke to ventilation air ratio will be higher than in the cigarette before movement of second stage filter element 19 to the rear, resulting in a more highly flavored cigarette.

Figure 4:
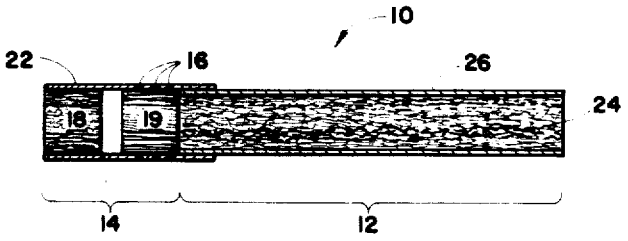
FIG. 4 is a longitudinal cross-section of another embodiment of the invention.

FIG. 4 shows another embodiment of the invention in which filter elements 18 and second stage filter element 19 have not been enclosed by a plug wrap. Also in this embodiment, ventilation holes 16 are located at the forward end of filter mouthpiece 14. Thus, ventilation air must travel through second stage filter element 19 resulting in a stronger flavored cigarette. In this embodiment, tapping filter mouthpiece 14 against a hard surface moves second stage filter element 19 towards first stage filter element 18 uncovering ventilation holes 16, thus, decreasing the smoke to ventilation air ratio. Therefore, this embodiment produces a weaker flavored cigarette when the filter mouthpiece 14 is tapped against a hard surface. This embodiment might be useful for changing the ventilation ratio after the cigarette has been partially smoked when the flavor normally becomes stronger as the length of the smoking cylinder 12 decreases.

Figure 5:
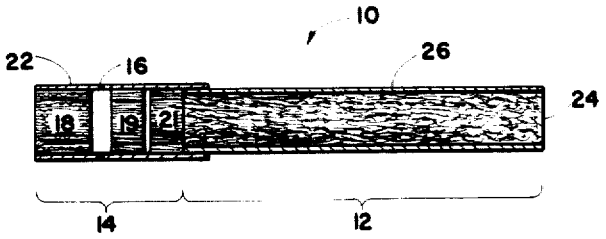
FIG. 5 is a longitudinal cross-section of a smoking article according to the present invention with a third stage filter element.

FIG. 5 shows another embodiment of the invention with a third stage filter element 21. All three filter elements in this embodiment are shown with a non-wrapped acetate filter although here also a wrapped or non-wrapped filter element could be used. First stage filter element and third stage filter element are rigidly attached to tipping paper 22. Second stage filter element 19 is free to move axially in filter mouthpiece 14. This embodiment prevents shifting of the tobacco when filter mouthpiece 14 is tapped since third stage element 21 is rigidly attached directly behind smoking cylinder 12.

The embodiment shown in FIG. 5 may also be used as a detachable cigarette holder. In this case, tipping paper 22 would be more rigid than the earlier embodiments, plastic would be a suitable material, and would not be attached to smoking cylinder 12. When used as a cigarette holder the smoking cylinder would be inserted into mouthpiece 14. Smoke to ventilation air ratio would be adjusted as described below.

It is thus seen that in a cigarette according to the present invention, the smoke to ventilation air ratio may be varied by the smoker simply and effectively. It is also seen that a cigarette according to the present invention is of simple construction and compatible with modern high speed cigarette making machines.

I claim:

1. In a smoking article the improvements which comprise:

a filter mouthpiece attached to one end of said smoking article by air impervious tipping paper[;] *having* a second stage filter means mounted in said mouthpiece behind the tobacco portion of said smoking article and free to move in an axial direction in said mouthpiece in response to tapping said mouthpiece on a hard surface;

a first stage filter means rigidly mounted in said mouthpiece behind said second stage filter means such that there is space for axial movement of said second stage filter; and ventilation holes in said air impervious tipping paper forward of said first stage filter and behind the tobacco portion of said smoking article.

2. A smoking article as in claim 1 wherein a third stage filter means is rigidly mounted in said mouthpiece forward of said second stage filter means and behind the tobacco portion of said smoking article.

3. A smoking article as in claim 1 wherein said ventilation holes are located immediately behind the tobacco portion of said smoking article.

4. A smoking article as in claim 1 or 2 wherein said filter means are enclosed in a porous plug wrap.

5. A smoking article as in claim 1 or 2 wherein said filter means are non-wrapped acetate filters.

6. A filter mouthpiece comprising:

an air impervious outer shell;

a third stage filter means rigidly mounted near one end of said outer shell;

a first stage filter means rigidly mounted near the opposite end of said outer shell;

a second stage filter means mounted in said mouthpiece between said first and third stage filter means and free to move axially in said mouthpiece in response to tapping said mouthpiece on a hard surface; and ventilation holes in said air impervious outer shell between said first stage and third stage filter means.

7. A smoking article as in claim 1 or 2 [or 6] wherein said ventilation holes are located immediately forward of said first stage filter means.

8. A smoking article as in claim 2 [or 6] wherein said ventilation holes are located immediately behind said third stage filter means.

*9. A filter mouthpiece as in claim 6 wherein said ventilation holes are located immediately forward of said first stage filter means.*

*10. A filter mouthpiece as in claim 6 wherein said ventilation holes are located immediately behind said third stage filter means.*

*11. A filter mouthpiece as in claim 6 wherein said filter means are enclosed in a porous plug wrap.*

*12. A filter mouthpiece as in claim 6 wherein said filter means are non-wrapped acetate filters.*

*13. A filter mouthpiece for a smoking article, said mouthpiece having a forward end to be disposed to receive smoke drawn into the mouthpiece, and a rearward end to be received in the mouth, consisting essentially of:*

*tipping paper formed into a cylinder and adapted to be attached to a smoking cylinder at its forward end and to define the exterior wall of said mouthpiece;*

*a first cylindrical filter element that is disposed in the cylinder formed by said tipping paper at the rearward end of said mouthpiece and that is rigidly secured to the inner surface of the tipping paper,*

*a second cylindrical filter element that is disposed in the cylinder formed by said tipping paper at its forward end, in spaced relation to at least one of said forward end of the mouthpiece and said first filter element, to define a cylindrical chamber within said mouthpiece that is bounded by and extends to the inner surface of said tipping paper,*

*said second filter element is free to move in an axial direction within said cylindrical tipping paper, in response to tapping said mouthpiece on a hard surface, and*

*said tipping paper having at least one aperture that can communicate with said chamber to admit air to said chamber.*

*14. The filter mouthpiece of claim 13 wherein both of said filter elements are enclosed respectively in a cylindrical porous plug wrap, wherein the plug wrap about said first filter element is rigidly secured to the inner surface of said tipping paper.*

*15. The mouthpiece of claim 13 wherein said second filter element is spaced from said first filter element, to define said chamber between said two filter elements.*

*16. The filter mouthpiece of claim 13 wherein said second filter element is free to move in an axial direction within said cylindrical tipping paper, in response to tapping the rearward end of said mouthpiece on a hard surface, and wherein after causing such movement to occur, said second filter element has been moved toward said first filter element and is spaced from a said smoking cylinder and from the forward end of said mouthpiece.*

*17. The filter mouthpiece of claim 16 wherein said second filter element is free to move in an axial direction within said cylindrical tipping paper, in response to tapping the forward end of either of said mouthpiece or of an attached smoking cylinder, on a hard surface.*

*18. The filter mouthpiece of claim 13 comprising a third cylindrical filter element that is rigidly secured in place inside said cylindrical tipping paper, at the forward end of said mouthpiece, for abutment against the smoking material in an attached smoking cylinder.*

*19. A filter cigarette comprising a smoking cylinder and, attached to one end of said smoking cylinder, a filter mouthpiece according to claim 13.*

* * * * *

UNITED STATES PATENT AND TRADEMARK OFFICE

CERTIFICATE OF CORRECTION

PATENT NO. : Re. 32,221

DATED : August 12, 1986

INVENTOR(S) : John M. Adams

It is certified that error appears in the above-identified patent and that said Letters Patent is hereby corrected as shown below:

On the title page Insert

-- (73) Assignee: Philip Morris Incorporated,
New York, N. Y. --.

Signed and Sealed this

Eleventh Day of November, 1986

*Attest:*

DONALD J. QUIGG

*Attesting Officer*

*Commissioner of Patents and Trademarks*